United States Patent
Timpf, Jr. et al.

(10) Patent No.: US 9,573,476 B2
(45) Date of Patent: Feb. 21, 2017

(54) METHOD AND APPARATUS FOR CONTROLLER WAKEUP USING CONTROL PILOT SIGNAL FROM CHARGE PORT

(71) Applicant: GM GLOBAL TECHNOLOGY OPERATIONS LLC, Detroit, MI (US)

(72) Inventors: Thomas John Timpf, Jr., Royal Oak, MI (US); Cody D. Berman, Ann Arbor, MI (US); Vivekananda Shripathy, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 361 days.

(21) Appl. No.: 14/299,278

(22) Filed: Jun. 9, 2014

(65) Prior Publication Data

US 2015/0352967 A1 Dec. 10, 2015

(51) Int. Cl.
*B60L 11/18* (2006.01)
*H02J 7/00* (2006.01)
*B60L 3/00* (2006.01)

(52) U.S. Cl.
CPC .......... *B60L 11/1809* (2013.01); *B60L 3/0084* (2013.01); *B60L 11/1816* (2013.01); *H02J 7/007* (2013.01); *Y02T 10/7005* (2013.01); *Y02T 10/7072* (2013.01); *Y02T 10/92* (2013.01); *Y02T 90/14* (2013.01)

(58) Field of Classification Search
CPC . B60L 11/1809; B60L 11/1816; B60L 3/0084; H02J 7/007; Y02T 10/7005; Y02T 10/92; Y02T 10/7072; Y02T 90/14
See application file for complete search history.

(56) References Cited

U.S. PATENT DOCUMENTS

| 6,437,460 | B1* | 8/2002 | Theofanopoulos | B60L 11/1809 307/10.1 |
| 8,179,086 | B2* | 5/2012 | Nakaso | B60K 6/445 320/104 |
| 8,476,865 | B2* | 7/2013 | Iwanaga | B60K 6/445 180/65.21 |
| 8,749,198 | B2* | 6/2014 | Klesyk | H03K 5/04 320/108 |
| 9,290,104 | B2* | 3/2016 | Gadh | B60L 11/1838 |
| 2011/0057611 | A1* | 3/2011 | Nakaso | B60K 6/445 320/109 |
| 2011/0193532 | A1* | 8/2011 | Iwanaga | B60K 6/445 320/163 |

(Continued)

*Primary Examiner* — Naum B Levin
(74) *Attorney, Agent, or Firm* — Quinn Law Group, PLLC

(57) ABSTRACT

A method and system for waking up a primary microcontroller of a controller in response to a change in a control pilot signal generated by an external device coupled to the controller includes coupling the external device to an input port electrically connected to the controller. A control pilot signal generated by the external device is received by the input port and outputted to a monitoring device of the controller in low power mode. The monitoring device in low power mode polls the control pilot signal and upon detecting a valid change transitions to normal power mode to output a wakeup pulse to the primary microcontroller, which in a sleep state receives the wakeup pulse and wakes up to execute instructions stored on the primary microcontroller. In an example, the system controls recharging of a battery by a charging station which outputs a pulse width modulated control pilot signal.

17 Claims, 1 Drawing Sheet

(56) References Cited

U.S. PATENT DOCUMENTS

| | | | | |
|---|---|---|---|---|
| 2013/0110296 A1* | 5/2013 | Khoo | ............... | B60L 11/1825 700/286 |
| 2013/0119931 A1* | 5/2013 | Klesyk | ............... | H03K 5/04 320/109 |
| 2014/0062401 A1* | 3/2014 | Gadh | ............... | B60L 11/1838 320/109 |
| 2015/0097525 A1* | 4/2015 | DeDona | ............... | B60L 11/1838 320/109 |

* cited by examiner

METHOD AND APPARATUS FOR CONTROLLER WAKEUP USING CONTROL PILOT SIGNAL FROM CHARGE PORT

TECHNICAL FIELD

The invention generally relates to a method of waking up a controller using a control pilot signal from an external device connectable to the controller, and more specifically to a method of waking up a battery charge controller using a pulse width modulated control pilot signal generated by a battery charging station.

BACKGROUND

A plug-in electric vehicle (PEV) is a motor vehicle which includes a rechargeable battery, which may also be referred to as a battery pack or fuel cell, which can be charged from an external source of electricity. The electrical energy stored in the rechargeable battery may be used in a PEV to power one or more electric motors that provide tractive torque to propel the vehicle. Plug-in electric vehicles (PEV) include all-electric or battery electric vehicles (BEVs), plug-in hybrid vehicles (PHEVs), and electric vehicle conversions of hybrid electric vehicles and conventional internal combustion engine vehicles.

The external source of electricity used to charge the battery of a PEV is typically provided by Electric Vehicle Supply Equipment (EVSE), also referred to as an electric vehicle (EV) charging station, a charging point, or a charging station. Each PEV includes a battery charge controller responsible for plug-in charging of the vehicle. The charging station outputs a control pilot to wake up the battery charge controller during a charging event. This control pilot output is a pulse width modulated signal. Hardware based wakeup detection circuitry in the battery charge controller determines the controller response to the control pilot.

SUMMARY

EVSE industry standards and specifications for control pilot wakeup change regularly, for example, in response to changes made by EVSE manufacturers, such that PEVs including battery charge controllers having hardware based wakeup detection circuitry may require costly replacement of the battery charge controller or components thereof to remain current with EVSE control pilot wakeup standards and specifications as the vehicle ages.

A system for waking up a primary microcontroller of a controller from one of a sleep state and a powered off state in response to a change in a control pilot signal generated by an external device coupled to the controller is provided. In one example, the controller is a battery charger controller and the external device is a battery charging station, also referred to herein as a charging station. In this example, the system is a system for waking up a primary microcontroller of a battery charge controller from a sleep state in response to a change in a control pilot signal generated by a charging station coupled to the battery charge controller is provided. By way of example, the system may be a system of a plug-in vehicle (PEV) including the battery charge controller of the vehicle and the vehicle charge port, where the battery charge controller and the vehicle charge port are each connectable to a rechargeable battery of the vehicle. The rechargeable battery may be selectively used to power one or more battery powered mechanisms in the system. In one example, the battery powered mechanism may be an electric motor that provides tractive torque to propel the vehicle.

The battery charge controller includes the primary microcontroller and a monitoring device, which may be a monitoring microcontroller, an additional resource within the same microcontroller, or a smart device. The monitoring device is reprogrammable such that as EVSE control pilot wakeup standards and/or specifications change the monitoring device may be adapted by reprogramming to the changes, advantageously avoiding costly replacement of battery charging control hardware.

By way of example, the battery charge controller is electrically connected to a charge port. The charge port and the battery charge controller are each connectable to a rechargeable battery, such that charging of the battery by electrical power received via the charge port coupled to the charging station can be controlled by the battery charge controller. The charge port is connectable to the charging station to receive the control pilot signal generated by the charging station and to selectively receive electric power via the charging station to charge the rechargeable battery. The charge port outputs the control pilot signal received from the charge station to the battery charge controller.

The primary microcontroller of the battery charge controller has a processor and memory on which is recorded instructions for controlling charging of the rechargeable battery by the charging station. The primary microcontroller is programmed to either selectively execute the instructions from the primary microcontroller memory or remain in a complete power off state, to thereby detect a wakeup pulse generated by the monitoring device while the primary microcontroller is in a sleep state, and to wake up from the sleep state in response to the wakeup pulse to control charging of the rechargeable battery by the charging station and other electric vehicle functions. The monitoring device is configured to receive the control pilot signal output from the charge port and has a processor and memory on which is recorded instructions for waking up or powering on the primary microcontroller. As used herein, the primary microcontroller may be woken up from a sleep state or from a power off state, where waking the controller from a power off state includes powering on the primary microcontroller. The monitoring device is programmed to selectively execute the instructions from the monitoring device memory to thereby poll the control pilot signal for a change in the control pilot signal while operating in low power mode, detect the change in the control pilot signal, and output the wakeup pulse to the primary microcontroller in response to detecting the change in the control pilot signal. In one example, the monitoring device is further programmed to selectively execute the instructions from the monitoring device memory to thereby determine if a wakeup criteria is met based on the detected change in the control pilot signal while the monitoring device is operating in low power mode, transition from low power mode to normal power mode upon determining the wakeup criteria is met, and after transitioning to normal power mode, validate whether the wakeup criteria are met. The monitoring device outputs the wakeup pulse to the primary microcontroller upon validating the wakeup criteria have been met, or returns to a low power mode to continue polling the control pilot signal when the wakeup criteria are not validated.

The monitoring device is reprogrammable such that the recorded instructions are reprogrammable from a current set of instructions to a subsequent set of instructions to provide flexibility to reprogram the battery charge controller for changes in wakeup criteria, control pilot signals, duty cycles and the like. In one example, the monitoring device is reprogrammable such that the wakeup criteria of the current set of instructions differs from the wakeup criteria of a subsequent set of instructions programmed into the monitoring device. In another example, the monitoring device may be one of a microcontroller and a smart device.

A method for waking up a primary microcontroller of a controller from one of a sleep state and a powered off state in response to a change in a control pilot signal generated by an external device coupled to the controller is provided. The method includes coupling the external device to an input port, where the input port is electrically connected to the controller and a controlled component. In one example, the controller is a battery charger controller and the external device is a battery charging station, also referred to herein as a charging station. In this example, the method is a method for waking up a primary microcontroller of a battery charge controller from a sleep state in response to a change in a control pilot signal generated by a charging station coupled to the battery charge controller is provided. The method further includes receiving to the charge port a control pilot signal generated by the charging station and outputting the control pilot signal from the charge port to the battery charge controller. The battery charge controller includes a primary microcontroller and a monitoring device, configured as previously described herein. At the time of coupling, the primary microcontroller is in a sleep or powered down state and the monitoring device is in low power mode. The method further includes receiving the control pilot signal to the monitoring device operating in low power mode, polling the control pilot signal to detect a change in the control pilot signal using the monitoring device operating in low power mode, detecting the change in the control pilot signal using the monitoring device in low power mode, and outputting the wakeup pulse to the primary microcontroller in response to detecting the change in the control pilot signal using the monitoring device in normal power mode such that the primary microcontroller in the sleep state receives the wakeup pulse and wakes up from the sleep state or powered down state in response to the wakeup pulse such that the primary microcontroller can control charging of the rechargeable battery by the charging station.

The method may further include determining if a wakeup criteria is met based on the detected change in the control pilot signal using the monitoring device in low power mode, transitioning the monitoring device from low power mode to normal power mode upon determining the wakeup criteria is met, and after transitioning to normal power mode, validating the wakeup criteria are met using the monitoring device in normal power mode. The wakeup pulse is outputted to the primary microcontroller upon validating the wakeup criteria have been met using the monitoring device in normal power mode. If the wakeup criteria are not met, the monitoring device transitions to low power mode and continues to poll for change in the control pilot signal.

In one example, the method further includes diagnosing whether the primary microcontroller has woken up in response to the wakeup pulse and setting a wakeup diagnostic flag when the primary microcontroller does not wake up using the monitoring device. In another example, the method may further include, after waking up the primary microcontroller, diagnosing the primary microcontroller using the monitoring device to determine whether a difference exists between a measured value of a charging characteristic measured by the primary microcontroller at a sample time and a comparator value of the charging characteristic measured by the monitoring device at the sample time, and setting a measurement diagnostic fault when the difference is greater than a threshold difference.

The above features and advantages and other features and advantages of the present invention are readily apparent from the following detailed description of the best modes for carrying out the invention when taken in connection with the accompanying drawings.

DETAILED DESCRIPTION

Figure 1:
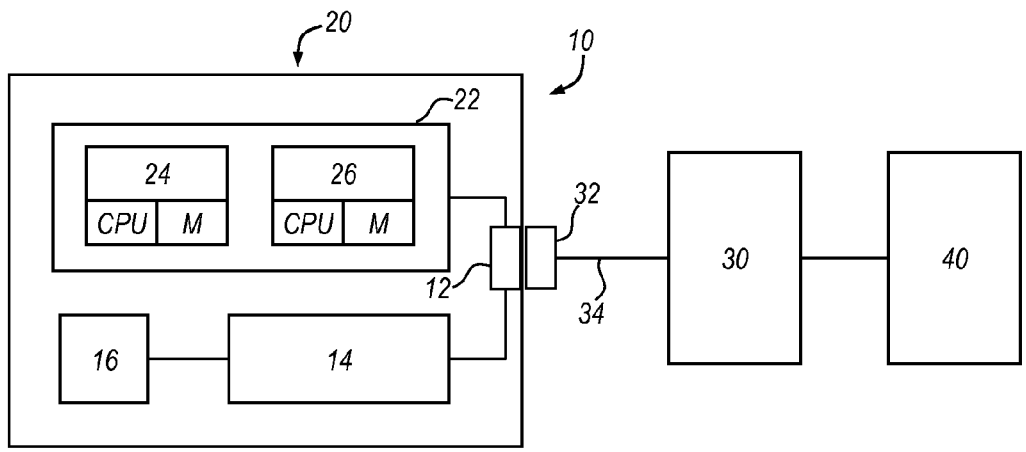
FIG. 1. is a schematic block diagram of an example system including a battery charge controller.

Referring to the Figures wherein like reference numbers correspond to like or similar components throughout the several figures, a system is generally shown at 20 in FIG. 1 and includes a controller 22 having a reprogrammable monitoring device 26 programmed to execute a set of instructions for waking up a primary microcontroller 24 of the controller 22 from a sleep state in response to a change in a control pilot signal generated by an external device 30 coupled to the controller 22 via an input port 12 of the system 20. The controller 22 is connected to an input port 12. The external device 30 is connectable to the input port 12 such that the external device 30 is electrically connectable to the controller 22 via the input port 12. In an illustrative example, the system is a battery charge control system 20 and the controller 22 is a battery charge controller 22 having a reprogrammable monitoring device 26 programmed to execute a set of instructions for waking up a primary microcontroller 24 of the battery charge controller 22 from a sleep state in response to a change in a control pilot signal generated by an external device 30 which is configured as a battery charging station 30 coupled to the battery charge controller 22. In the example system 20 described herein, the input port 12 is configured as a charging port 12 which is connectable to the battery charging station 30, and the system 20 further includes a rechargeable battery 14 electrically connected to the charging port 12. A method for waking up the primary microcontroller 24 of the controller 22 from a sleep state in response to a change in a control pilot signal generated by an external device 30 coupled to the controller 22 is generally shown at 100 in FIG. 2. In an illustrative example, the method is a method for waking up a controller 22 configured as a battery charge controller 22 having a reprogrammable monitoring device 26 programmed to execute a set of instructions for waking up a primary microcontroller 24 of the battery charge controller 22 from a sleep state in response to a change in a control pilot signal generated by an external device 30 which is configured as a battery charging station 30 coupled to the battery charge controller 22. In the example method 100 described herein, the input port 12 is configured as a charging port 12 which is connectable to the battery charging station 30, and the system 20 further includes a rechargeable battery 14 electrically connected to the charging port 12. Referring to FIG. 1 and by way of example, the system 20 may be included in a plug-in vehicle (PEV) generally indicated at 10 and including a battery charge controller 22 and a charge port 12, where the battery charge controller 22 and the charge port 12 are each connectable to a rechargeable battery 14 of the vehicle. The battery charge controller 22 includes a primary microcontroller 24 and a monitoring device 26. The rechargeable battery 14 may be selectively used to power one or more battery powered mechanisms 16 in the system 20. In the example of a PEV 10, the battery powered mechanism 16 may be an electric motor 16 that provides tractive torque to propel the vehicle 10.

The example of the system 20 incorporated in a PEV 10 as shown in FIG. 1 is non-limiting, and it would be understood that the system 20 and method 100 described herein for waking up a battery charge controller 22 from a sleep state in response to a change in a control pilot signal generated by a charging station 30 coupled to the battery charge controller 22 may be used in non-vehicle applications including a battery 14 which is rechargeable by a charging station 30. The rechargeable battery 14 may be configured, for example, as a pack of rechargeable batteries, one or more fuel cells, or other energy storage devices which are capable of storing and being recharged with electrical energy. A "plug-in" electric vehicle (PEV) 10, as that term is used herein, refers to a type of vehicle 10 having a rechargeable battery 14 which is chargeable with off-board electricity, e.g., chargeable from a power source 40 located external to the vehicle 10, by means of connecting the vehicle 10 to the power source 40, for example, via a charging station 30. The electrical energy stored in the rechargeable battery 14 may be used in a PEV 10 to power one or more battery powered mechanisms 16, which may be include at least one electric motor 16 that provides tractive torque to propel the vehicle 10. Plug-in electric vehicles (PEV) 10 include all-electric or battery electric vehicles (BEVs), plug-in hybrid vehicles (PHEVs), and electric vehicle conversions of hybrid electric vehicles and conventional internal combustion engine vehicles.

The external source 40 of electricity used to charge the battery 14 of the PEV 10 may be provided by Electric Vehicle Supply Equipment (EVSE) indicated at 30 in FIG. 1. The EVSE 30 is also referred to and/or known as an electric vehicle (EV) charging station, a charging point, or a charging station. In the example shown in FIG. 1, the system 20 is connectable to the charging station 30 via a charge port 12 of the system 20. The charging station 30 may include a charging connector 34 having a charge input 32 which is connectable to the charge port 12 of the system 20. The charge input 32 may also be referred to herein as a charge plug 32. The charging station 30 is configured to output a control pilot via a connection established between the connector 34 and the charge port 12, which is received by the battery charge controller 22 and used by the battery charge controller 22 to control charging of the battery 14 during a battery charging event. The charging station 30 may send a control pilot wakeup to the battery charge controller 22 to wake the battery charge controller 22 from a sleep state. The battery charge controller 22 may be in a sleep state, for example, when the PEV 10 is in a power-off condition or when the system 20 receives a command from the PEV 10 to place the battery charge controller 22 in a sleep state, for example, to conserve energy.

The control pilot wakeup signal may be determined by industry standards which are, for example, standards developed by manufacturers of EVSE, and may change over time. Advantageously, the battery charge control system 20 and method 100 described herein provide for a battery charge controller 22 including a primary microcontroller 24 and a monitoring device 26, which may be a monitoring microcontroller or a smart device. The monitoring device 26 monitors the control pilot and is programmed to wake up the primary microcontroller 24 of a battery charge controller 22 from a sleep state in response to a validated change in the control pilot signal. The monitoring device 26 may be a microcontroller, additional resource within the primary microcontroller 24, or a smart device which can be reprogrammed when industry wakeup standards are changed, such that reprogramming of the monitoring device 26 can occur, for example, through the electrical system of the vehicle 10, or wirelessly in the case of a monitoring device 26 which is a smart device, thus providing a cost-effective and flexible means to update the battery charge control system 20 for changes in EVSE standards without having to remove or replace hardware based wakeup detection circuitry, advantageously avoiding costly replacement of battery charging control hardware.

As shown in FIG. 1, the battery charge controller 22 includes the primary microcontroller 24, which is capable of controlling charging of the battery 14, and the monitoring device 26, which is capable of polling a control pilot signal received from the charging station 30 via the charging connector 32 connected to the charge port 12 of the system 20. Each of the battery charge controller 22, the primary microcontroller 24 and the monitoring device 26 may include a computer and/or processor, and include all software, hardware, memory, algorithms, connections, sensors, etc., necessary to manage and control the battery charging operation performed by the battery charging system 20. For example, each of the battery charge controller 22, the primary microcontroller 24, and the monitoring device 26 may include a central processing unit (CPU) and sufficient memory M, at least some of which is tangible and non-transitory. Memory M may include sufficient read only memory (ROM), random access memory (RAM), electrically-programmable read-only memory (EPROM), flash memory, etc., and any required circuitry including but not limited to a high-speed clock (not shown), analog-to-digital (A/D) circuitry, digital-to-analog (D/A) circuitry, a digital signal processor (DSP), and the necessary input/output (I/O) devices and other signal conditioning and/or buffer circuitry.

The battery charge controller 22 may be in communication with a user interface (not shown), which may be a wired or wireless interface, to receive instructions regarding charging of the system 20, for example, instructions to defer charging to an off-peak time, to perform charging at a predetermined time or an otherwise scheduled time which may be a time when the cost of power, e.g., the power cost rate is decreased and/or the power demand on the external power source 40 is decreased, or for user convenience, e.g., to recharge the battery 14 during a time interval when the use of the vehicle 10 or system 20 by the user is not required.

The battery charge controller 22 is programmed or otherwise configured such that when the system 20 is placed in a power-off condition, the primary microcontroller 24 is transitioned to a sleep or powered down state and the monitoring device 26 is operated in low power mode. In one example, turning the ignition of the PEV 10 to an "off" or "power-off" position transitions the primary microcontroller 24 to a sleep or powered down state and transitions the monitoring device 26 to a low power mode. In one example, the monitoring device 26 is operated in ultra low power mode with the system 20 in a power-off condition. By example, the PEV 10 may be configured to power the monitoring device 26 by one of the battery 14 or another battery (not shown) in the PEV, where the other battery is a standard automotive battery such as a 12V battery.

As shown in FIG. 1, the rechargeable battery 14 is electrically connected to the charge port 12. The charge port 12 is connectable to the charging station 30 to receive and output a control pilot signal generated by the charging station 30 and to selectively receive electric power from an external power source 40 via the charging station 30. In one example, the control pilot signal comprises at least one of a discrete input or a pulse width modulation (PWM). The control pilot signal is encoded to communicate, for example, a PWM corresponding to a PWM duty cycle or frequency which may indicate ampere capacity available for charging, compatibility, etc. The control pilot signal changes based on conditions defined by the charging station 30, the power source 40 and the rechargeable battery 14. For example, the PWM signal may change between a first PWM indicating the charge station 30 is disconnected from the system 20, a second PWM indicating the charge station 30 is connected to the system 20, and a hold state indicating the charge station is waiting, for example, for payment to the charge station for electrical power to be used to charge the battery 14. A change in the control pilot, for example, from a PWM indicating the charge station 30 is disconnected from the system 20 to a PWM indicating the charge station 30 is connected to the system 20 can be monitored, where the change may be interpreted as a wake up signal to the battery charge controller 22 to wake up the battery charge controller 22 to control charging of the battery 14 during a charging event. In the example shown in FIG. 1, and as described in further detail herein, the monitoring device 26 is configured to poll the control pilot signal to determine if a valid wake up signal has been received, to validate the wake up signal as a valid wakeup signal, and after validating the wakeup signal, to send a wakeup pulse to the primary microcontroller 24 to wake up.

The primary microcontroller 24 has a processor CPU and memory M on which is recorded instructions for controlling charging of the battery 14, which include detecting a wakeup pulse generated by the monitoring device 26. The primary microcontroller 24 is programmed to selectively execute the instructions from the memory M or to remain in an off power mode to wake up from a sleep mode in response to the wakeup pulse received from the monitoring device 25, and upon awakening, to control charging of the rechargeable battery 14 by the charging station. The primary microcontroller 24 is programmed to selectively execute the instructions to control charging of the rechargeable battery 14, for example, by one or more of controlling the energy flow from the charging station 30 to the battery 14 during charging of the battery 14, setting a charging schedule including one or more of a charging set time, a charging power level, and a charging end time, discontinue charging of the battery 14 upon charging of the battery 14 to a predetermined state of charge, and returning the primary microcontroller 24 to sleep mode or off mode after charging of the battery 14 is discontinued. Charging of the battery 14 may be discontinued, for example, by one of an instruction executed by the primary microcontroller 24 and disconnection of the charge port from the charging station 30. The primary microcontroller 24 is programmed to selectively execute the instructions to output a low power mode signal to the monitoring controller to return the monitoring controller from normal power mode to low power mode, and to selectively output a disregard signal to the monitoring controller to disregard the control pilot signal to the charge port for one of a predetermined period of time and a predetermined condition, for example, to defer charging of the battery 14 to a scheduled time period, which may be a time period when power cost rates are decreased, or for a predetermined condition, such a completion of payment to the charging station.

The monitoring device 26 is configured to receive the control pilot signal generated by the charging station 30 and communicated via the charge connector 34 and/or charge plug 32 connected to the charge port 12, where the control pilot signal received from the charge plug 32 is output from the charge port 12 to the monitoring device 26. The monitoring device 26 has a processor and memory M on which is recorded instructions for outputting the wakeup pulse to the primary microcontroller 24. The monitoring device 26 is programmed to selectively execute the instructions from the memory M to poll the control pilot signal for a change in the control pilot signal, where the polling is performed while the monitoring device 26 is in low power mode, for example, when the system 20 and/or the PEV 10 are in a power-off condition. Upon detecting a change in the control pilot signal, and while remaining in low power mode, the monitoring device 26 performs an initial determination of whether the change in the control pilot signal meets wakeup criteria. The wakeup criteria may include, for example, one or more of the control pilot signal having a PWM in a predetermined PWM range where the predetermined PWM range corresponds to a condition where the charge station 30 is connected to the charge port 12, confirming a current time, which may be the current time as determined by a clock included in the battery charge controller 22, is within a scheduled time range and where the scheduled time range corresponds to one of a predetermined power cost rate and a predetermined demand period. Upon making an initial determination that the wakeup criteria has been met, the monitoring device 26 is programmed to transition from a low power mode to a normal power mode, and after transitioning to normal power mode, to perform a secondary determination to validate the wakeup criteria are met. Once the wakeup criteria have been validated as valid wakeup criteria by the monitoring device 26 operating in normal power mode, the monitoring device 26 outputs a wakeup pulse to the primary microcontroller 24 upon. If, during the secondary determination the monitoring device 26 fails to validate the wakeup criteria, e.g., determines the change in the control pilot signal detected by the monitoring device 26 in low power mode does not meet the wakeup criteria when assessed by the monitoring device 26 in normal power mode, the monitoring device 26 returns to low power mode and continue to poll for change in the control pilot signal without sending a wakeup pulse to the primary microcontroller 24.

In one example, after outputting a wakeup pulse to the primary microcontroller 24, the monitoring device 26 performs a diagnostic to diagnose whether the primary microcontroller 24 has woken up in response to the wakeup pulse. If the monitoring device 26 determines the primary microcontroller 24 did not wakeup in response to the wakeup pulse, the monitoring device 26 sets a wakeup diagnostic flag. At the next powering-on of the system 20, for example, during the next powering-on of the PEV 10 and the system 20, the wakeup diagnostic flag is detected by the system 20, for example, detected by the battery charge controller 22, and a wakeup performance fault is set in the diagnostic system of the battery charge control system 20 and/or in the diagnostic system of the PEV 10. In another example, after the primary controller 24 awakes from a sleep state and transitions to a wake state, the monitoring device 26 is programmed to selectively execute the instructions from the memory M to diagnose the primary microcontroller 24 to determine whether a difference exists between a measured value of a charging characteristic measured by the primary microcontroller 24 at a sample time and a comparator value of the charging characteristic measured at the sample time by one of the monitoring device 26 and the charging station 30, and to set a measurement diagnostic fault when the difference is greater than a threshold difference.

Advantageously, the monitoring device 26 is reprogrammable, such that the recorded instructions are reprogrammable from a current set of instructions to a subsequent set of instructions, where reprogramming may be required, for example, in response to a change in standards applied to EVSE 30, where the change in standards may, for example, modify the duty cycles corresponding to the various PWM of the control pilot signal, or for example, when the wakeup criteria of the current set of instructions differs from the wakeup criteria of the subsequent set of instruction.

Figure 2:
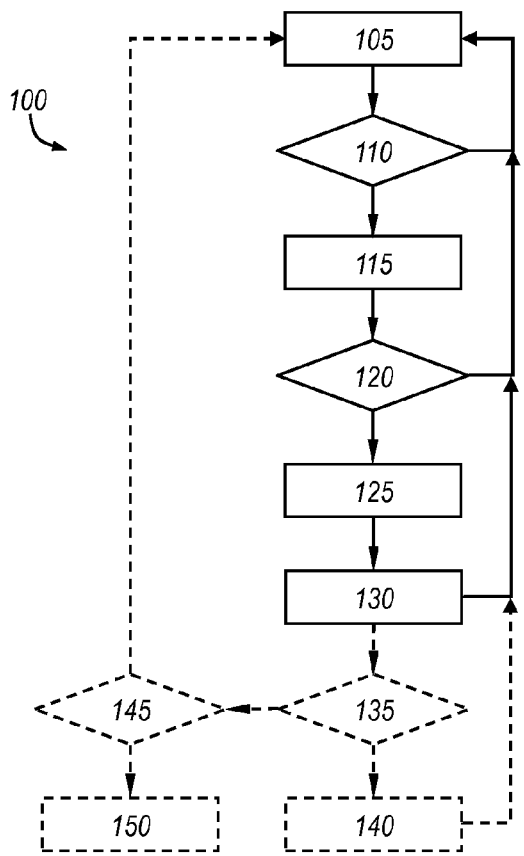
FIG. 2 is a flow chart describing an example method for waking up the battery charge controller of the example system of FIG. 1.

Referring now to FIG. 2, a method is generally indicated at 100 for waking up the primary microcontroller 24 of the controller 22 from one of a sleep state and a powered off state and in response to a change in a control pilot signal generated by an external device 30 coupled to the controller 22 via an input port 12. The method, in an illustrative example, may be applied to the example system 20 shown in FIG. 1, where the controller 22 is a battery charge controller 22 programmed with instructions to control charging of a rechargeable battery 14, the external device 30 is a charging station 30, and the input port 12 is a charging port 12. The method begins with the primary microcontroller 24 in a sleep state or powered off state and the monitoring device 26 operating in low power mode. At step 105, the monitoring device 26 operating in low power mode polls the control pilot signal to detect a change in the control pilot signal. Upon detecting the change in the control pilot signal using the monitoring device 26 in low power mode, the method proceeds to step 110, where the monitoring device 26 in low power mode makes an initial determination if the detected change in the control pilot signal meets wakeup criteria, as previously described herein. If the monitoring device 26 in low power mode determines the wakeup criteria are met, the method proceeds to step 115. If the wakeup criteria are not met during the initial determination, the method returns to step 105 and the monitoring device 26 continues to poll for change in the control pilot signal.

At step 115, the monitoring device 26 transitions from low power mode to normal power mode and the method continues to step 120, where the monitoring device 26 in normal power mode validates whether the detected change in the control pilot signal meets wakeup criteria. If the monitoring device 26 in normal power mode validates that the wakeup criteria are met, the method proceeds to step 125. If the wakeup criteria are not validated by the monitoring device 26 in normal power mode, the monitoring device 26 transitions to low power mode and returns to step 105 to continue to poll for a subsequent change in the control pilot signal.

At step 125, after validating the wakeup criteria are met at step 120, the monitoring device 26 outputs the wakeup pulse to the primary microcontroller 24 to be received by the primary microcontroller 24 in a sleep state. At step 130, the primary microcontroller 24 receives the wakeup pulse and wakes up from the sleep state.

By way of example, the method may optionally (as indicated in FIG. 2 by the dotted lines) include a step 135. At step 135, the monitoring device 26 diagnoses whether the primary microcontroller 24 has woken up in response to the wakeup pulse. When the primary microcontroller 24 does not wake up, the monitoring device 26 sets a wakeup diagnostic flag at step 140, and the monitoring device 26 transitions to low power mode and returns to step 105 to continue to poll for a subsequent change in the control pilot signal. The wakeup diagnostic flag is detected at the next power-up of the system 20, and a wakeup diagnostic fault is set. In another example, the method may optionally (as indicated in FIG. 2 by dotted lines) include a step 145, where after waking up the primary microcontroller 24, the monitoring device 26 diagnoses the primary microcontroller 24 to determine whether a difference exists between a measured value of a charging characteristic measured by the primary microcontroller 24 at a sample time and a comparator value of the charging characteristic measured at the sample time by one of the monitoring device 24 and the charging station 30, and setting a measurement diagnostic fault at step 150 when the difference is greater than a threshold difference. The measurement diagnostic flag is detected by the system 20 at the next power-up of the system 20, and a measurement diagnostic fault is set. After completing the diagnosis, the monitoring device 26 transitions to low power mode and returns to step 105 to continue to poll for a subsequent change in the control pilot signal.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A system comprising:
   a controller electrically connected to an input port;
   the input port connectable to an external device to receive
      a control pilot signal generated by the external device
      and to output the control pilot signal to the controller;
      and
   the controller comprising:
      a primary microcontroller having a processor and
         memory on which is recorded instructions, wherein
         the primary microcontroller is programmed to selectively execute the instructions from the primary
         microcontroller memory to thereby:
         detect a wakeup pulse generated by a monitoring
            device while the primary microcontroller is in one
            of a sleep state and a powered off state;
         wake up from the one of the sleep state and powered
            off state in response to the wakeup pulse;
      the monitoring device configured to receive the control
         pilot signal output from a charge port and having a
         processor and memory on which is recorded instructions for waking up the primary microcontroller,
         wherein the monitoring device is programmed to
         selectively execute the instructions from the monitoring device memory to thereby:
         poll the control pilot signal for a change in the
            control pilot signal while operating in low power
            mode;
         detect the change in the control pilot signal while
            operating in low power mode;
         determine, while operating in low power mode, if a
            wakeup criteria is met based on the detected
            change in the control pilot signal;
         upon determining the wakeup criteria has been not
            been met, continue to poll the control pilot
            signal for a change in the control pilot signal
            while operating in low power mode;
         upon determining the wakeup criteria has been
            met, transition from low power mode to normal
            power mode;

after transitioning to normal power mode, validate, while operating in normal power mode, whether the wakeup criteria are met;
upon validating the wakeup criteria have not been met, transition from normal power mode to low power mode and poll the control pilot signal for a change in the control pilot signal while operating in low power mode; and
upon validating the wakeup criteria have been met, output the wakeup pulse to the primary microcontroller in response to detecting and validating the change in the control pilot signal.

2. The system of claim 1, wherein:
the controller is a battery charge controller connectable to a rechargeable battery;
the input port is a charge port electrically connectable to the rechargeable battery;
the external device is a battery charging station; and
the charge port is connectable to the battery charging station to selectively receive electric power via the charging station to charge the rechargeable battery; and
the primary microcontroller including recorded instructions for controlling charging of the rechargeable battery by the battery charging station, wherein the primary microcontroller is programmed to selectively execute the instructions from the primary microcontroller memory to thereby wake up from the one of the sleep state and powered off state in response to the wakeup pulse to control charging of the rechargeable battery by the battery charging station.

3. The system of claim 1, wherein the control pilot signal comprises at least one of a discrete input signal and a pulse width modulated (PWM) signal.

4. The system of claim 1, wherein the wakeup criteria includes one of:
the control pilot signal having a pulse width modulation (PWM) in one of a plurality of predetermined PWM ranges;
wherein each of the plurality of predetermined PWM ranges corresponds to a respective one of a plurality of duty cycles of the charging station.

5. The system of claim 1, wherein the primary microcontroller is further programmed to selectively execute the instructions to thereby:
return the primary microcontroller to the one of the sleep state and the powered off state after charging of the battery is discontinued; and
output a signal to the monitoring device to return the monitoring controller from normal power mode to low power mode.

6. The system of claim 1, wherein the primary microcontroller is further programmed to selectively execute the instructions to thereby:
output a disregard signal to the monitoring device to disregard the control pilot signal from the charge port for one of a predetermined period of time and a predetermined condition.

7. The system of claim 1, wherein the monitoring device is programmed to selectively execute the instructions from the memory to thereby:
diagnose whether the primary microcontroller has woken up in response to the wakeup pulse and set a wakeup diagnostic flag when the primary microcontroller does not wake up.

8. The system of claim 7, wherein a wakeup performance fault is set upon detection of the wakeup diagnostic flag after transition of the system from a power-off condition to a power-on condition.

9. The system of claim 1, wherein when the system is in a power-off condition the monitoring device operates in low power mode.

10. The system of claim 1, wherein:
the monitoring device is reprogrammable, such that the recorded instructions are reprogrammable from a current set of instructions to a subsequent set of instructions; and
wherein the wakeup criteria of the current set of instructions differs from the wakeup criteria of the subsequent set of instructions.

11. The system of claim 1, wherein the monitoring device is one of a microcontroller, an additional resource of the primary microcontroller, and a smart device.

12. A method comprising:
coupling an external device to an input port;
wherein the input port is electrically connected to a controller;
receiving to the input port a control pilot signal generated by the external device;
outputting the control pilot signal from the input port to the controller;
the controller comprising a primary microcontroller and a monitoring device;
the primary microcontroller having a processor and memory on which is recorded instructions;
the monitoring device having a processor and memory on which is recorded instructions for waking up the primary microcontroller from one of a sleep state and a powered off state;
wherein at the time of coupling, the primary microcontroller is in one of the sleep state and the powered off state and the monitoring device is in low power mode;
the method further comprising:
receiving the control pilot signal to the monitoring device operating in low power mode;
polling the control pilot signal to detect a change in the control pilot signal using the monitoring device operating in low power mode;
detecting the change in the control pilot signal using the monitoring device in low power mode; and
outputting the wakeup pulse to the primary microcontroller in response to detecting the change in the control pilot signal using the monitoring device in normal power mode;
receiving the wakeup pulse to the primary microcontroller from the one of the sleep state and the powered off state to wake up from the primary microcontroller from the sleep or powered off state in response to the wakeup pulse such that the primary microcontroller can execute the instructions of the primary controller;
diagnosing, using the monitoring device, whether the primary microcontroller has woken up in response to the wakeup pulse; and
setting a wakeup diagnostic flag, using the monitoring device, when the primary microcontroller does not wake up.

13. The method of claim 12, wherein:
the controller is a battery charge controller connectable to a rechargeable battery;
the input port is a charge port electrically connectable to the rechargeable battery;

the external device is a battery charging station; and the charge port is connectable to the battery charging station to selectively receive electric power via the charging station to charge the rechargeable battery; and the instructions of the primary microcontroller including instructions for controlling charging of the rechargeable battery by the battery charging station, wherein the primary microcontroller is programmed to selectively execute the instructions from the primary microcontroller memory to thereby wake up from the one of the sleep state and powered off state in response to the wakeup pulse to control charging of the rechargeable battery by the battery charging station.

14. The method of claim 12, further comprising:

determining if a wakeup criteria is met based on the detected change in the control pilot signal using the monitoring device in low power mode;

transitioning the monitoring device from low power mode to normal power mode upon determining the wakeup criteria is met;

after transitioning to normal power mode, validating the wakeup criteria are met using the monitoring device in normal power mode;

outputting the wakeup pulse to the primary microcontroller upon validating the wakeup criteria have been met using the monitoring device in normal power mode; and returning the monitoring device to low power mode and continuing to poll for change in the control pilot signal using the monitoring device in low power mode when the wakeup criteria are not met.

15. A vehicle comprising:

a battery charge control system including a charge port electrically connected to a battery charge controller and connectable to a rechargeable battery;

the charge port connectable to a charging station to receive and output a control pilot signal generated by the charging station and to selectively receive electric power from an external power source via the charging station;

the battery charge controller comprising a primary microcontroller and a monitoring device;

the primary microcontroller having a processor and memory on which is recorded instructions for controlling charging of the rechargeable battery, wherein the primary microcontroller is programmed to selectively execute the instructions from the memory to thereby:

detect a wakeup pulse generated by the monitoring device while the primary microcontroller is in one of a sleep state and a powered off state;

wake up from the one of the sleep state and the powered off state in response to the wakeup pulse to control charging of the rechargeable battery by the charging station;

the monitoring device configured to receive the control pilot signal output from the charge port;

the monitoring device having a processor and memory on which is recorded instructions for waking up the primary microcontroller, wherein the monitoring device is programmed to selectively execute the instructions from the memory to thereby:

while operating in low power mode:

poll the control pilot signal to detect a change in the control pilot signal; and upon detecting the change in the control pilot signal, determine if a wakeup criteria is met;

transition from low power mode to normal power mode upon determining the wakeup criteria is met;

while in normal power mode:

validate the wakeup criteria are met;

output the wakeup pulse to the primary microcontroller upon validating the wakeup criteria have been met; and return to low power mode and continue to poll for change in the control pilot signal when the wakeup criteria are not met.

16. The vehicle of claim 15, wherein:

the wakeup criteria include confirming a current time is within a scheduled time range: and the scheduled time range corresponds to one of a predetermined power cost rate and a predetermined power demand period.

17. The system vehicle of claim 15, wherein with the system in a power-on condition, the monitoring device is programmed to selectively execute the instructions from the memory to thereby:

diagnose the primary microcontroller to determine whether a difference exists between a measured value of a charging characteristic measured by the primary microcontroller at a sample time and a comparator value of the charging characteristic measured by the monitoring device at the sample time; and set a measurement diagnostic fault when the difference is greater than a threshold difference.

* * * * *